United States Patent [19]

Wooddy, Jr.

[11] 4,086,561
[45] Apr. 25, 1978

[54] MARINE SEISMOGRAPH CABLE BALANCING

[76] Inventor: Douglas William Wooddy, Jr., 134 Lafitte Dr., Waveland, Mich. 39576

[21] Appl. No.: 697,011

[22] Filed: Jun. 17, 1976

[51] Int. Cl.² ............................................. G01V 1/38
[52] U.S. Cl. ...................................... 340/7 PC; 61/70
[58] Field of Search ............ 340/7 PC, 3 T; 114/244, 114/245; 9/8 R; 61/70; 174/101.5

[56] References Cited

U.S. PATENT DOCUMENTS

| | | | |
|---|---|---|---|
| 2,729,300 | 1/1956 | Paslay et al. | 340/7 PC |
| 3,374,636 | 3/1968 | Mason | 61/70 |
| 3,375,800 | 4/1968 | Cole et al. | 114/245 |
| 3,440,992 | 4/1969 | Chance | 340/7 PC |
| 3,597,779 | 8/1971 | Morgan | 174/101.5 |
| 3,713,299 | 1/1973 | Duncan | 61/70 |
| 3,808,824 | 5/1974 | Johnston et al. | 61/70 |
| 3,851,488 | 12/1974 | Schuler | 61/70 |
| 3,992,735 | 11/1976 | McCarthy | 9/8 R |
| 3,996,654 | 12/1976 | Johnson | 9/8 R |

*Primary Examiner*—Howard A. Birmiel

[57] ABSTRACT

A form fitting, flexible, multi-element device to be used as a weight to be attached to a geophysical cable. Said device is constructed of a plurality of molded and contoured lead inserts suitable placed inside of heat shrinking tubing such that after shrinking the finished product adheres to the normal parameters of the geophysical cable. Said device is attached to the geophysical cable by means of a locking band or strap.

4 Claims, 6 Drawing Figures

MARINE SEISMOGRAPH CABLE BALANCING

In marine seismograph operations, a cable containing many geophones is towed behind a recording boat at a predetermined depth. The depth at which the cable is towed is critical, also the entire cable must be at the same depth to insure quality geophysical records. As geophysical recording cables in present use are up to four miles in length, it is not an easy task to maintain the entire cable at it's predetermined depth. Controlling the depth of the cable is accomplished by using more that one method simultaneously, the most important part of this being what is known in the trade as balancing the cable. It is with this function of balancing the cable that I am concerned. As delivered from the factory the geophysical cable will float. The function of balancing the cable is to bring the cable to a point of neutral buoyancy. In order to balance the cable to a point of neutral buoyancy, lead weights are attached all along the cable at a spacing of approximately 25 to 40 feet. The lead weights are in the form of sheet lead and are attached to the cable with adhesive tape. Several layers of tape are wound around the cable, then the sheet lead is wrapped around the cable over the protective layers of tape; then several more layers of tape are wound over the sheet lead weight. After the weights are taped all along the cable the cable is towed behind the boat at normal operating speed and checked for balance by means of depth tranducers inside of the cable. The front end of the cable is set at the planned operating depth by means of a lead-in and a heavy weight. As such the front end of the cable can be changed by raising or lowering of the lead-in. The remainder of the cable would stream behind the front end of the cable at the same depth if the cable were properly balanced. The cable is now reeled in and where deemed necessary by means of the depth indications obtained, weights are removed or added to the cable. This process is repeated untill the cable is balanced, sometimes taking as long as three to four days. As prefection is almost impossible to obtain in this operation, a second method must also be employed to insure that the cable will remain at it's intended depth, not only during good times but also during times that the cable is adversely affected by weather conditions, water currents and varying salinity, such as when working around the outlet of the Mississippi River. To this end hydrostatic active elements are attached to the cable which through the use of active planes attempt to maintain the cable or at least the part of the cable to which it is attached at the predetermined depth to which the device (CON-DEPTH) has been set. The number of these active devices that can be attached to the cable is severely limited by size, water drag and induction of noise into the sensitive geophones of the cable. Due to the operating limitations and the small number of active devices that can be attached to the cable, The function of balancing the cable becomes the single most important factor in obtaining a properly functioning seismic recording cable. At this point I am only interested in the construction and method of attaching weights to the cable. I shall list the disadvantages of the presently used method and the advantages of the method and construction of the system that I propose.

DISADVANTAGES OF THE PRIOR METHOD (1) It takes an average of two minutes to tape a weight to the cable. Non-productive time for a geophysical vessel is computed at the rate of up to $1000.00 per hour. Lost potential profit could of course bring this figure much higher.

(2) An average of fifty feet of tape is used per weight.

(3) Due to deterioration the outer covering of tape must be renewed every thirty to fourty days resulting in more non-productive time and use of tape.

(4) As the tape deteriorates it will often loosen and migrate down the cable, becoming entangled in the planes of the active devices. This requires more non-productive down-time for maintenance.

(5) Due to the rough surface presented by the taped surface of the cable, water drag is increased, reducing working speed and increasing unwanted noise, resulting in lower quality seismic records and decreased production.

(6) Miles of wasted tape from each geophysical cable add to the pollution of our oceans each year.

(7) As a conservative estimate there would be a 100% wastage of lead each year due to tape deterioration with resultant lead loss.

(8) There is the possibility of health hazards in the cutting and handling of raw lead.

ADVANTAGES OF MY SYSTEM (1) My cable weights can be installed in ten seconds or less. My weights can be removed in five seconds or less. Non-productive time is vastly reduced.

(2) No tape is used.

(3) No periodic maintenance is required.

(4) My weights will not interfere with any other part or function of the cable.

(5) Due to the slim and compact design, smooth surface and absence of loose particles, water drag and noise is decreased, resulting in more production and higher quality seismic records.

(6) No pollution.

(7) No lead loss. The weights are simple to remove and may be used over and over again.

(8) No health hazards.

(9) The uniformity of my weights makes for better control.

DETAILED DESCRIPTION OF THE DRAWINGS

FIG'S. 1,2 and 3 show an individual weight 10 in varying degrees of manufacture.

Figure 1:
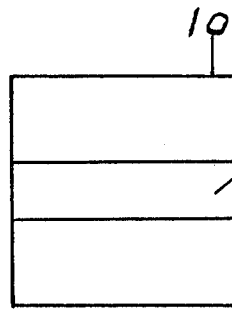
FIG. 1 is a top view of an individual weight 10, showing the slot 20.

FIG. 1 is a top view of an individual weight 10 as it comes from the mold. This individual weight 10 has a slot 20 that was formed in the mold.

Figure 2:
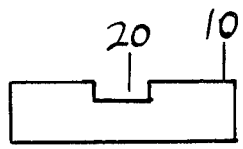
FIG. 2 is an cross-section end view of an individual weight 10, showing the slot 20.

FIG. 2 is an end view of FIG. 1. FIG. 2 clearly shows the slot 20 pre-formed in the individual weight 10.

Figure 3:
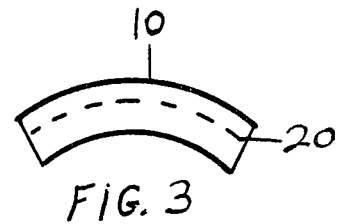
FIG. 3 is a side view of a contoured weight 10, showing the slot in dashed lines.

FIG. 3 shows an individual weight 10 that has been contoured for a specific geophysical cable diameter. In FIG. 3 the slot 20 is shown by dotted lines.

Figure 4:
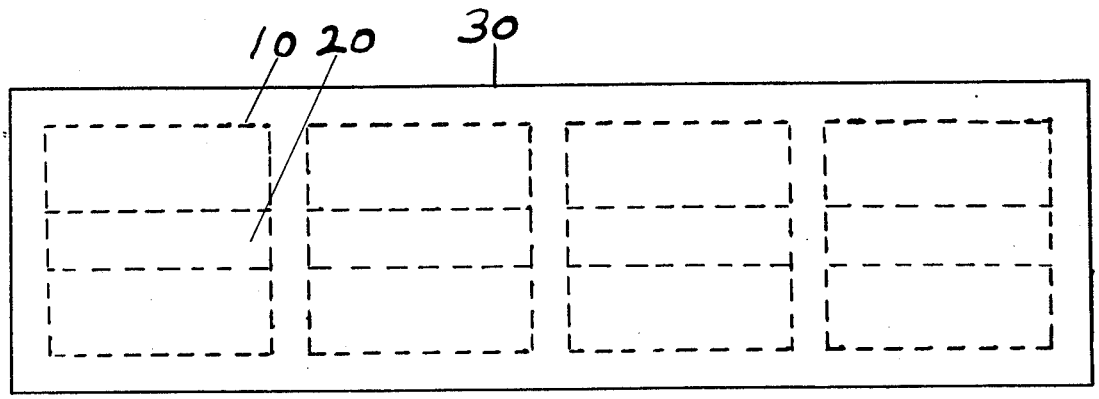
FIG. 4 is a top view showing four individual weights 10 with their slots 20 lined up, inserted into a jacket of heat shrinking tubing 30.

FIG. 4 is a top view of an assembled cable weight prior to shrinking and forming. The individual weights 10 are symmetrically placed inside of the shrink tubing 30 such that their slots 20 are aligned with the open ends of the shrink tubing 30.

Figure 5:
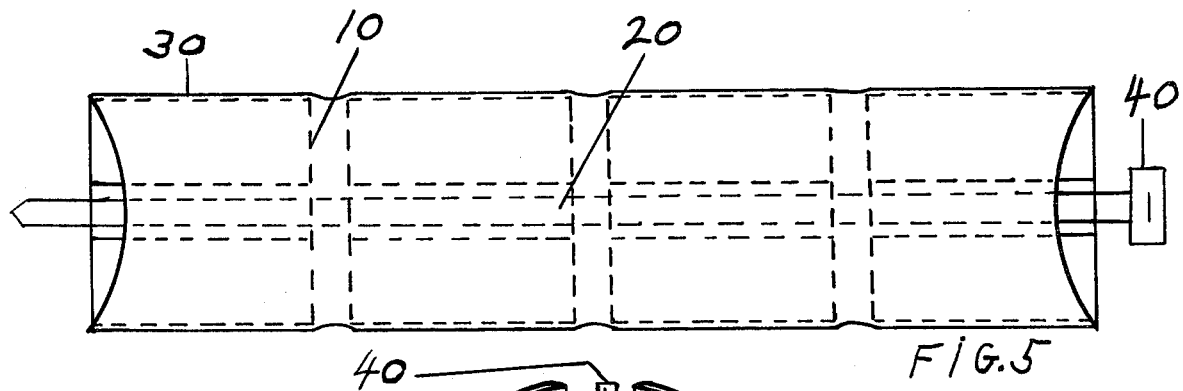
FIG. 5 is a top view showing the same configuration as FIG. 4 except that the tubing has now been heat treated and a removeable strap 40 has now been inserted through the cable weight.

FIG. 5 is a top view of a completed cable weight with a strap 40 inserted. The shrink tubing 30 has been heat treated and now conforms to the individual weights 10 dimensions. The strap 40 was inserted through the slots 20 of each individual weight 10. The shrink tubing 30 contains the individual weights 10 and the strap 40.

Figure 6:
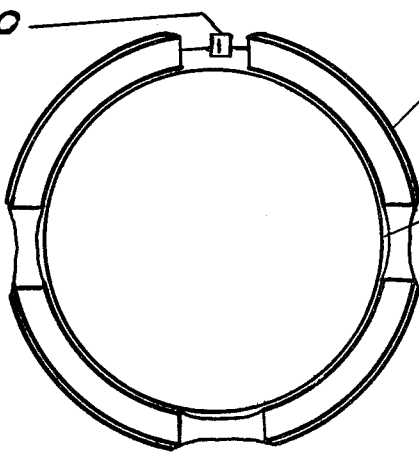
FIG. 6 shows the complete cable weight 50 installed on a geophysical cable 60.

FIG. 6 shows a completed and formed cable weight 50 installed on a geophysical cable 60. The free end of the strap 40 has now been pulled through the class end of the strap 40 and pulled tight and neatly trimmed.

METHOD OF CONSTRUCTION AND USE

Each weight is cast using a mold of the proper dimensions of size, shape and composition to adapt my invention to a specific requirement. Each cast weight has a unique feature, a groove or slot, cast as an integral part of each weight. This groove or slot is to allow the passage of a strap or band through the completed cable weight. Two or more weights will be used in the construction of a completed cable weight. The strap or band is then used to secure the complete cable weight to the geophysical cable. It is this feature that allows the cable weight to be securely and snugly fastened to the cable, yet be easily removed and be re-used by the simple insertion of a new strap or band. I do not define or show a strap or band as there are commercial available several straps and bands of plastic and/or metal construction that are quite adequate for this application. However, the use of a low price, strong easily replaced strap or band is an important part of my invention. Each weight is contoured such that it's inner side will follow the outer shape of the cable to which it will later be attached. Since all geophysical cables are cylindrical in shape but their diameter may vary, this step is very important and I consider it a special feature of my invention: the compactness and streamlining of the finished product, as opposed to the prior method. The slot or groove is on the convex surface of the contoured weight. The contoured weights are now placed inside a Jacket of heat shrinking tubing. The slots or grooves in the weights are lined up lenght-wise so that the strap or band may be passed through the finished cable weight. The number of weights to be inserted into the heat shrinking tubing could of course be varied as desired but would in most cases be two or four. For clarity, I show four being used in the construction of a complete cable weight in the attached drawings. The spacing between the weights would be determined by the desired finished circumference of the completed cable weight. The complete cable weight need not be made in one continuous piece. It may be made in one or more parts as desired. The heat shrinking tubing with the weights inside is now placed into an oven or any type of unit that will provide the proper heat to shrink the tubing. After the tubing has shrunk and formed itself to the shape of the weights the cable weight is removed from the heat source and placed around a form the the shape and size of the geophysical cable it is to be attached to later and allowed to cool. Cooling may be accelerated by the use of water. This last step allows the cable weight to retain the shape of the cable, yet it is still flexible. Sometimes the geophysical cable is crushed or otherwise distorted while being stored onto it's holding reel. Upon being unreeled and the cable returning to normal shape, so to will this cable weight as opposed to the prior method where-in the weight would remain crushed. The use of heat shrinking tubing with it's unique characteristics is another important feature of my invention. The heat treated tubing provides a strong, flexible, perfectly formed, streamlined support and outer covering for the weights. The band or strap may now be inserted through the finished cable weight and the complete cable weight attached to the geophysical cable. I do not define the heat shrinking tubing as it is commercialy available from several manufacturers in various sizes and colors. Heat treating specifications are supplied by each manufacture.

Having thus described the invention, what I claim as new and desire to secure by Letters Patent of the United States of America is:

1. A cable weight for installation upon the exterior of a geophysical cable, comprising:
   a plurality of weights of small size relative to the cross section of the geophysical cable, encased in and supported by an elongated section of heat shrinkable tubing; and
   a fastenable band or strap inserted through said tubing section for securing said relatively small weights to the exterior or said geophysical cable, said cable weight being thereby relatively easy to fasten to and remove from said cable.

2. A cable weight according to claim 1, wherein said relatively small weights are substantially rectangular in cross-section, being curved along their length in conformance to the cable curvature, and slotted along their outer side length to allow passage of said strap or band.

3. A cable weight according to claim 1, wherein said heat shrinkable tubing provides the outer covering and skeletal support for said cable weights.

4. A cable weight accoriding to claim 1, wherein said strap or band is of a permanent locking type, and is inserted through said slots along the outer side lengths of the individual weights, between the outer side lengths and said tubing.

* * * * *